June 4, 1957 — I. F. CLARK — 2,794,671
INNER PANEL WITH COMBINED ARMREST AND HANDHOLD
FOR VEHICLE DOORS
Filed Dec. 22, 1954 — 2 Sheets-Sheet 1
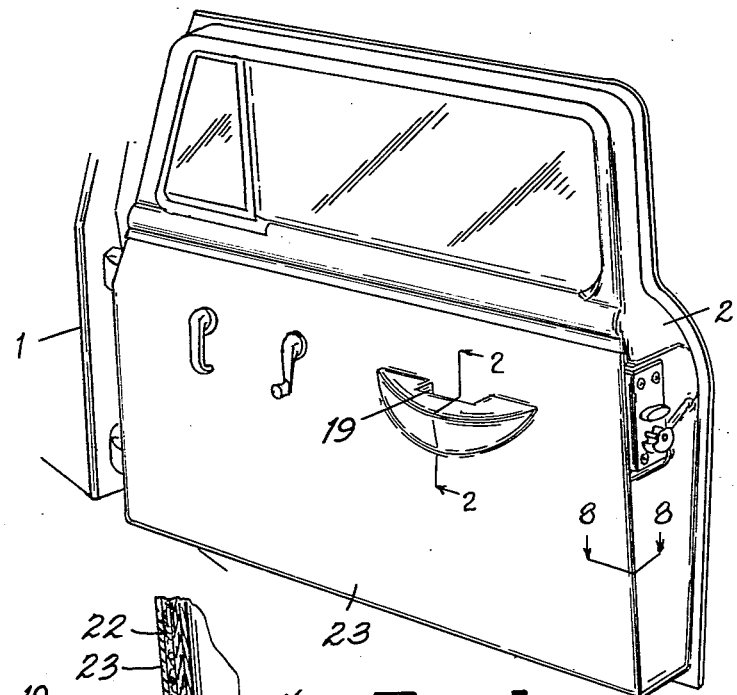
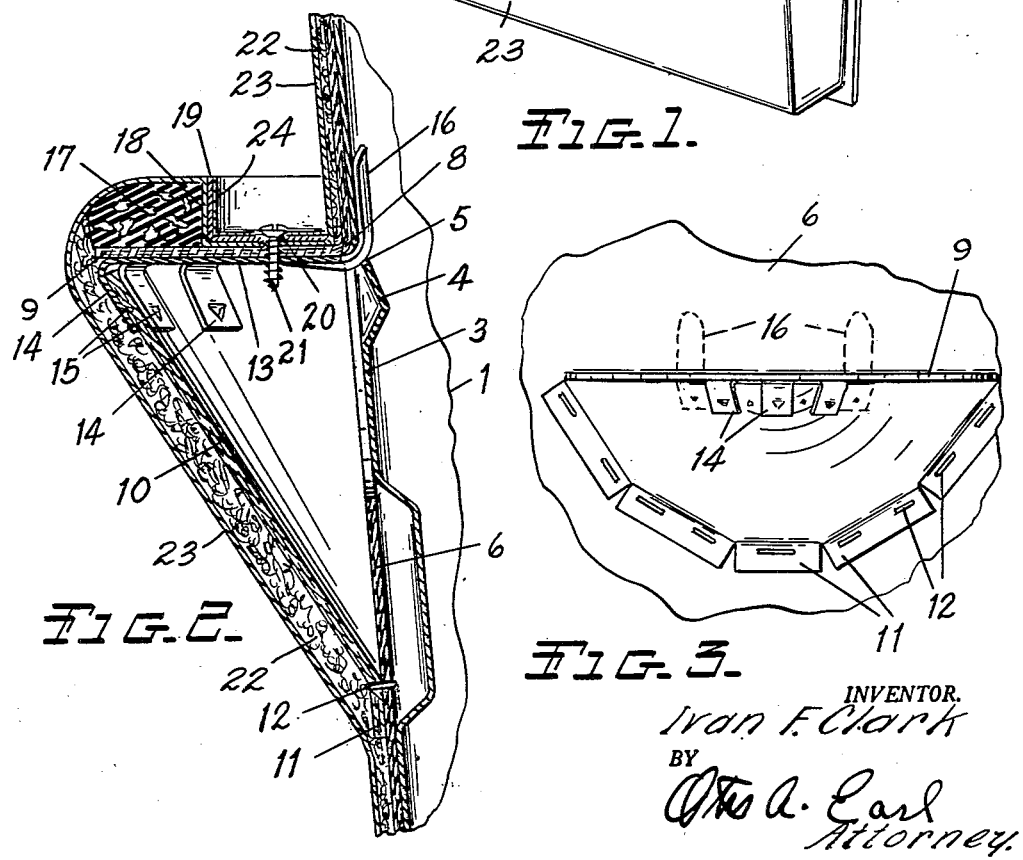
INVENTOR.
Ivan F. Clark
BY
Otis A. Earl
Attorney.

June 4, 1957

I. F. CLARK 2,794,671

INNER PANEL WITH COMBINED ARMREST AND HANDHOLD
FOR VEHICLE DOORS

Filed Dec. 22, 1954

INVENTOR.
Ivan F. Clark
BY
Otto A. Earl
Attorney

United States Patent Office 2,794,671
Patented June 4, 1957

2,794,671

INNER PANEL WITH COMBINED ARMREST AND HANDHOLD FOR VEHICLE DOORS

Ivan F. Clark, Lyons, Mich., assignor to Ivan Clark Manufacturing Co., Lyons, Mich.

Application December 22, 1954, Serial No. 476,890

14 Claims. (Cl. 296—44)

This invention relates to a door of the motor vehicle type and inner panel therefor. The main objects of the invention are:

First, to provide a door structure of the automobile type including an inner upholstery panel in which the panel may be economically produced and quickly assembled with the door applied to the inner wall of the door.

Second, to provide an upholstered inner panel for an automotive vehicle door including an armrest and a handhold which, while very economical in its parts, is strong and rigid, attractive in appearance and may be quickly assembled with doors of types now extensively in use.

Objects relating to details and economies of the invention will appear from the description to follow. The invention is pointed out in the claims.

A structure which embodies the features of the invention is clearly illustrated in the accompanying drawing, in which:

Fig. 1 is a perspective view of a motor vehicle door embodying my invention.

Fig. 2 is an enlarged fragmentary view in vertical section on a line corresponding to line 2—2 of Fig. 1.

Fig. 3 is a fragmentary front view of the panel with the upholstery and also the handhold omitted.

In the accompanying drawing, 1 represents the body of a motor vehicle and 2 the door thereof in which my invention is embodied. The door 2 includes an inner wall 3 formed of sheet metal. This inner wall has an offset 4 therein provided with openings 5, the purpose of which will be later pointed out. The door frame structure and the attachment of the inner wall 3 thereto form no part of my invention and therefore are not illustrated or described herein as door structures of this general type are known in the art.

Figure 4:
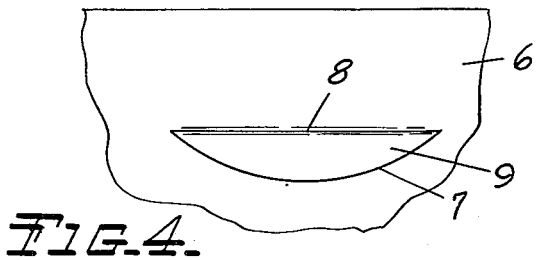
Fig. 4 is a fragmentary view illustrating certain steps in the forming of the panel of my invention.
Figure 5:
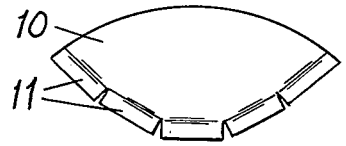
Fig. 5 is an elevational view of the blank from which the supporting bracket for the armrest member is formed.
Figure 6:
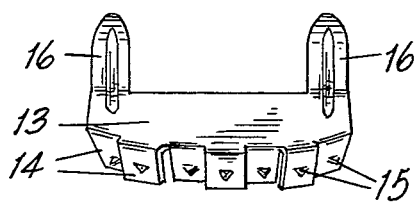
Fig. 6 is a top perspective view of the supporting plate for the armrest member.

The inner panel of my invention is dimensioned to constitute a covering for the wall 3 and is desirably upholstered and adapted to be applied as a complete upholstered unit. This panel as a completed unit includes an armrest and a handhold. The sheet or panel 6 is preferably formed of fiberboard and has a curved plate 7 therein as shown in Fig. 4 which is swingably connected at its inner edge 8 to the panel or sheet 6 so that the part 9 may be swung to a horizontal position as shown in Fig. 2 and constitutes an armrest member. The supporting bracket 10 for this armrest member is also formed of sheet fiberboard stock, the blank being shown in Fig. 5 and shaped so that when bent into a curved form it constitutes a conical downwardly tapering bracket. The side edges of the bracket are provided with flaps 11 which are lapped upon the outer side of the panel 6 and secured thereto by the staples 12.

The supporting plate 13 is desirably formed as a sheet metal stamping and is disposed in supported relation to the under side of the armrest member. This plate is provided with downwardly projecting tongues 14 which are alternately disposed on the inner and outer sides of the bracket member 10 and secured thereto by means of brads 15 struck from the tongues. This forms a very strong and rigid support for the armrest. The plate 13 is provided with upwardly projecting tongue-like clips 16 projecting from its inner edge and adapted to be inserted through the holes 5 in the wall 3.

The armrest is provided with cushioning or padding material 17, preferably of foam rubber or the like, and disposed to provide a recess 18 in which the handhold 19 is disposed. The handhold 19 is a sheet metal stamping and is provided with holes 20 for the screws 21, desirably sheet metal screws, which are threaded into the supporting plate.

The panel is provided with an upholstery covering which in the structure illustrated includes padding material 22 and a fabric, leather or other covering 23. The padding material extends over the bracket member and is preferably thicker at that point than at other portions of the panel. In the embodiment illustrated the covering 23 extends into the recess 18 for the handhold, the handhold being secured over the covering and the handhold itself being desirably provided with a lining indicated at 24. Thus arranged the handhold does not interfere with the convenient use of the armrest as an armrest and at the same time the handhold may be conveniently grasped.

Figure 8:
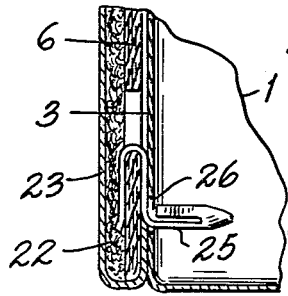
Fig. 8 is an enlarged fragmentary view mainly in section on a line corresponding to line 8—8 of Fig. 1 illustrating the manner of securing the panel of my invention to the door structure.
Figure 7:
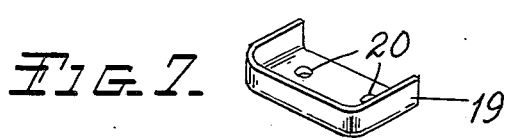
Fig. 7 is a perspective view of the handhold.

The panel is provided with snap fasteners indicated at 25 (Fig. 8) engageable with holes 26 provided in the wall 3 to receive the same. These fasteners are concealed so that in applying the panel to the wall the clips 16 are inserted through the holes 5 positioned to receive the same with an upward sliding movement of the panel which brings the fasteners 25 into position to be inserted in the holes 26. The clips 16 effectively connect the armrest to the wall 3 and resists the pull on the handhold.

Figure 9:
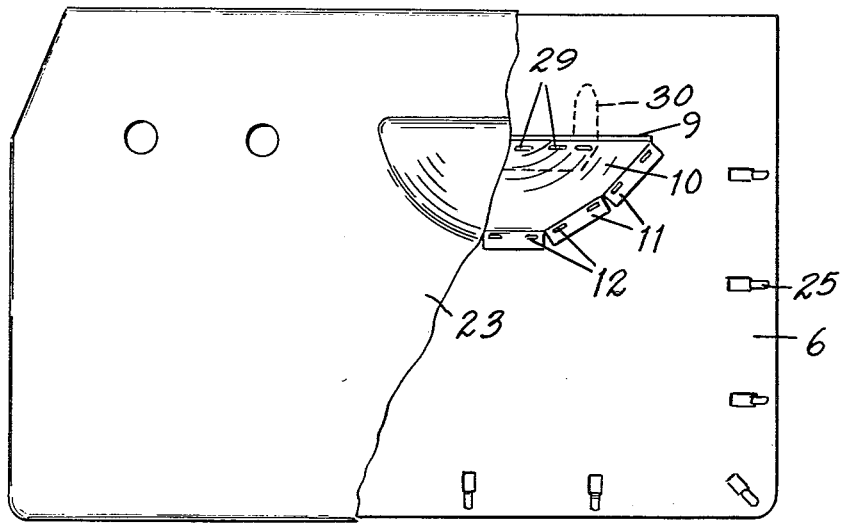
Fig. 9 is an elevational view of a modified form or embodiment of my invention, parts being broken away to show structural details.
Figure 10:
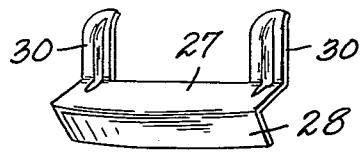
Fig. 10 is a top perspective view of the armrest supporting plate of the modification of Fig. 9.

In the embodiment of my invention shown in Figs. 9 and 10 the armrest supporting plate 27 is provided with a single downturned flange 28 on its outer edge disposed within the strut member 10 and secured thereto by the staples or stitches 29. The plate 27 has upwardly projecting clips 30 corresponding to the clips 16 of the plate 13.

Both forms or embodiments of my invention illustrated result in a strong and rigid combined armrest and handhold member and permit of production of an upholstery or finishing unit which may be economically produced, quickly applied, and at the same time results in the desired finish and appearance.

I have illustrated the invention in embodiments which have been found satisfactory. I have not attempted to illustrate other embodiments of which the invention is capable as it is believed this disclosure will enable those skilled in the art to practice the invention as may be desired.

Having thus described the invention, what is claimed as new and is desired to be secured by Letter Patent is:

1. A door structure of the class described comprising an inner wall having an inward offset therein, the offset having openings adjacent the upper edge thereof, a panel having an outwardly projecting segmental portion integrally formed therefrom and constituting an armrest member and handhold support, a segmental conically tapering bracket disposed below said armrest member and having integral attaching flaps at its edges lapped upon and fixedly secured to said panel, a segmental supporting plate for said armrest member supportingly disposed on the under side thereof and provided with a plurality of tongues alternately disposed on the inner and outer sides of said bracket member, said tongues having integral bracket engaging brads struck therefrom, said plate being provided with upwardly projecting anchoring clips engageable with said inner wall through said openings therein, a handhold member disposed upon said supporting plate, said panel being adapted for attachment to said inner wall as an assembled unit.

2. A door structure of the class described comprising an inner wall having an inward offset therein, the offset having openings adjacent the upper edge thereof, a panel having an outwardly projecting segmental portion integrally formed therefrom and constituting an armrest member and handhold support, a segmental conically tapering bracket disposed below said armrest member and a segmental supporting plate for said armrest member supportingly disposed on the under side thereof and secured to the upper end of said bracket member, said plate being provided with upwardly projecting anchoring clips engageable with said inner wall through said openings therein, a handhold member disposed upon said supporting plate, said panel being adapted for attachment to said inner wall as an assembled unit.

3. A door structure of the class described comprising an inner wall having an inward offset therein, the offset having openings adjacent the upper edge thereof, a panel having an outwardly projecting segmental portion integrally formed therefrom and constituting an armrest member and handhold support, a segmental conically tapering bracket disposed below said armrest member and a segmental supporting plate for said armrest member supportingly disposed on the under side thereof and secured to the upper end of said bracket member, said plate being provided with upwardly projecting anchoring clips engageable with said inner wall through said openings therein, a recessed upwardly facing handhold member disposed upon said armrest member and fixedly connected to said supporting plate, cushion material on said armrest member surrounding said handhold member, and a padded upholstery covering for said panel and said bracket thereon, said panel being adapted for attachment to said inner wall as an assembled unit.

4. A door structure of the class described comprising an inner wall, a unitary covering panel therefor having a portion struck out therefrom and constituting an armrest member and handhold support, a downwardly tapering bracket disposed below said armrest member with its side edges secured to the panel, a supporting plate for said armrest member disposed on the under side thereof with its outer edge secured to the upper edge of said bracket member, an upwardly facing handhold member disposed on said armrest member and connected to said supporting plate, cushioning material on said armrest member surrounding said handhold member, and a padded upholstery covering for said panel and said bracket, said panel being adapted for attachment to said inner wall as an assembled unit.

5. A door structure of the class described comprising an inner wall, a unitary covering panel therefor having a portion projecting therefrom and constituting an armrest member and handhold support, a bracket disposed below said armrest member and secured to the panel, a supporting plate for said armrest member disposed on the under side thereof with its outer edge secured to the upper edge of said bracket member, an upwardly facing handhold member disposed on said armrest member and connected to said supporting plate, cushioning material on said armrest member surrounding said handhold member, and a padded upholstery covering for said panel and said bracket, said panel being adapted for attachment to said inner wall as an assembled unit.

6. A door structure of the class described comprising an inner wall, a unitary covering panel therefor having a portion struck out therefrom and constituting an armrest member and handhold support, a downwardly tapering bracket disposed below said armrest member with its side edges secured to the panel, a supporting plate for said armrest member disposed on the under side thereof with its outer edge secured to the upper edge of said bracket member, an upwardly facing handhold member disposed on said armrest member and connected to said supporting plate.

7. A door structure of the class described comprising an inner wall, a unitary covering panel therefor having a portion struck out therefrom and constituting an armrest member and handhold support, a bracket disposed below said arm rest member with its side edges secured to the panel, a supporting plate for said arm rest member disposed on the under side thereof with its outer edge secured to the upper edge of said bracket member, said plate having clips projecting from its inner edge and engageable with said inner wall, and a handhold member disposed on said arm rest member and connected to said supporting plate, and cushioning material on said arm rest member surrounding said handhold member.

8. A door structure of the class described comprising an inner wall, a unitary covering panel therefor having a portion struck out therefrom and constituting an armrest member and handhold support, a bracket disposed below said armrest member with its side edges secured to the panel, a supporting plate for said arm rest member disposed on the under side thereof with its outer edge secured to the upper edge of said bracket member, said plate having clips projecting from its inner edge and engageable with said inner wall, and cushioning material on said armrest member surrounding said handhold member.

9. A panel unit adapted to be attached to the inner side of a door of a motor vehicle or the like, the panel comprising a sheet of fiberboard having a segmental portion struck outwardly therefrom and constituting an armrest member and handhold support, a segmental downwardly and conically tapering bracket member formed of fiberboard disposed below said arm rest member and having integral attaching flaps at its side edges lapped upon and fixedly secured to the outer side of said fiberboard sheet, a segmental supporting plate for said armrest member formed of sheet metal and supportingly disposed on the under side thereof and provided with a plurality of tongues alternately disposed on the inner and outer sides of said bracket member at the upper edge thereof, said tongues having integral bracket engaging brads struck therefrom, and a recessed upwardly facing handhold member disposed upon said armrest member and connected to said supporting plate.

10. A panel unit adapted to be attached to the inner side of a door of a motor vehicle or the like, the panel comprising a sheet of fiberboard having a segmental portion struck outwardly therefrom and constituting an armrest member and handhold support, a segmental downwardly and conically tapering bracket member formed of fiberboard disposed below said armrest member and fixedly secured to the outer side of said fiberboard sheet, a segmental supporting plate for said armrest member formed of sheet metal and supportingly disposed on the underside thereof, and a recessed upwardly facing handhold member disposed upon said armrest member and connected to said supporting plate.

11. An upholstered panel unit adapted to be attached to the inner side of a door of a motor vehicle or the like, the panel comprising a sheet of fiberboard having a portion struck outwardly therefrom and constituting an armrest member and handhold support, a downwardly tapering bracket member formed of fiberboard disposed below said armrest member and fixedly secured to the outer side of said fiberboard sheet, a segmental supporting plate for said armrest member formed of sheet metal and supportingly disposed on the under side thereof and secured to the upper edge of said bracket member, said plate having a door engaging clip at its inner edge, a recessed upwardly facing handhold member disposed upon said armrest member and connected to said supporting plate, padding material on said armrest member surrounding said handhold member thereof, and a padded upholstery covering for said sheet and said bracket thereon.

12. A panel unit adapted to be attached to the inner side of a door of a motor vehicle or the like, the panel comprising a sheet of fiberboard having a portion struck outwardly therefrom and constituting an armrest member and handhold support, a downwardly tapering bracket member formed of fiberboard disposed below said armrest member and fixedly secured to the outer side of said fiberboard sheet, a segmental supporting plate for said armrest member formed of sheet metal and supportingly disposed on the under side thereof and secured to the upper edge of said bracket member, said plate having a door engaging clip at its inner edge, and a handhold member disposed upon said armrest member and connected to said supporting plate.

13. An upholstered panel unit adapted to be attached to the inner side of a door of a motor vehicle or the like, the panel comprising a panel body having an armrest member and handhold support projecting therefrom, a bracket member disposed below said armrest member and secured to said panel, a supporting plate for said armrest member supportingly disposed on the under side thereof and secured to the upper edge of said bracket member, said plate having a door engaging clip at its inner edge, a recessed upwardly facing handhold member disposed upon said armrest member and connected to said supporting plate, cushioning material on said armrest member surrounding said handhold member thereof, and a padded upholstery covering for said body and said bracket thereon.

14. A panel unit adapted to be attached to the inner side of a door of a motor vehicle or the like, the panel comprising a panel body having an armrest member and handhold support projecting therefrom, a bracket member disposed below said armrest member and secured to said panel, a supporting plate for said armrest member supportingly disposed on the under side thereof and secured to the upper edge of said bracket member, said plate having a door engaging clip at its inner edge, and a handhold member disposed upon said armrest member and connected to said supporting plate.

References Cited in the file of this patent

UNITED STATES PATENTS

| | | |
|---|---|---|
| 1,996,480 | Menton | Apr. 2, 1935 |
| 2,019,247 | Blum | Oct. 29, 1935 |
| 2,601,677 | Wettlaufer | June 24, 1952 |